United States Patent [19]

Seki et al.

[11] Patent Number: 4,851,986

[45] Date of Patent: Jul. 25, 1989

[54] METHOD OF CREATING NC DATA FOR COMPLEX CURVED SURFACES

[75] Inventors: Masaki Seki; Kouji Samukawa, both of Tokyo, Japan

[73] Assignee: Fanuc Ltd., Minamitsuru, Japan

[21] Appl. No.: 143,133

[22] PCT Filed: Apr. 3, 1987

[86] PCT No.: PCT/JP87/00210

§ 371 Date: Dec. 3, 1987

§ 102(e) Date: Dec. 3, 1987

[87] PCT Pub. No.: WO87/06032

PCT Pub. Date: Oct. 8, 1987

[30] Foreign Application Priority Data

Apr. 4, 1986 [JP] Japan .................. 61-077745

[51] Int. Cl.$^4$ .............. G06F 15/32; G06F 15/46
[52] U.S. Cl. .................. 364/191; 364/474.29; 364/474.33; 318/567; 318/568.1
[58] Field of Search ............ 364/474.29, 474.33, 364/191, 474.05; 318/570, 567, 578

[56] References Cited

U.S. PATENT DOCUMENTS

| | | | |
|---|---|---|---|
| 4,491,906 | 1/1985 | Kishi et al. | 364/474.29 |
| 4,523,270 | 6/1985 | Kishi et al. | 364/474.29 |
| 4,535,408 | 8/1985 | Kishi et al. | 364/474.33 |
| 4,546,427 | 10/1985 | Kishi et al. | 364/474.29 |
| 4,589,062 | 5/1986 | Kishi et al. | 364/474.29 |
| 4,692,873 | 9/1987 | Kishi et al. | 364/474.33 |

Primary Examiner—Charles E. Atkinson
Assistant Examiner—Paul Gordon
Attorney, Agent, or Firm—Staas & Halsey

[57] ABSTRACT

A method of creating NC data for a complex curved surface (10) which has a combination of at least two three-dimensional curved surfaces (11, 12). The NC data creation method includes inputting data specifying each of the curved surfaces (11, 12) and data for specifying cutting path patterns (a pattern 21 of radiating straight lines and a pattern 22 of parallel straight lines) for respective ones of the curved surfaces. Points are obtained discretely from a cutting starting point ($P_i$) of one curved surface (11) to a boundary point ($R_i$) with the other curved surface (12) along the radiating-type cutting path pattern (21) set for this curved surface. Points are also obtained discretely on the other curved surface along the cutting path pattern (22) of parallel straight lines specified with respect to the other curved surface (12). A pick-feed is performed points are obtained discretely along the cutting path pattern on each of the curved surfaces in similar fashion. NC data for generating a complex curved surface by successively traversing each of the points, is created.

4 Claims, 6 Drawing Sheets

FIG. I
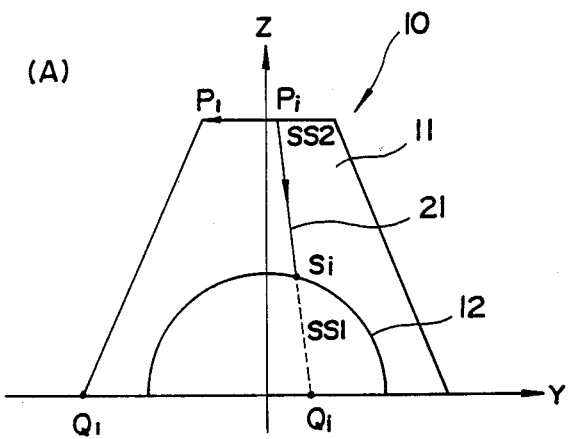
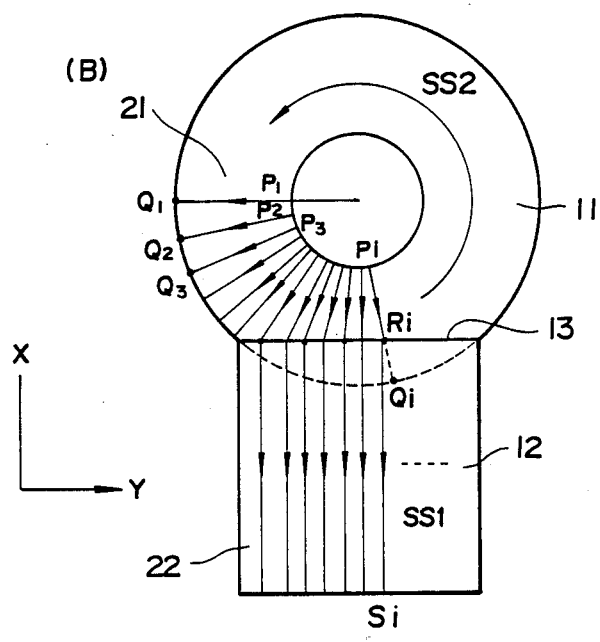

FIG 4
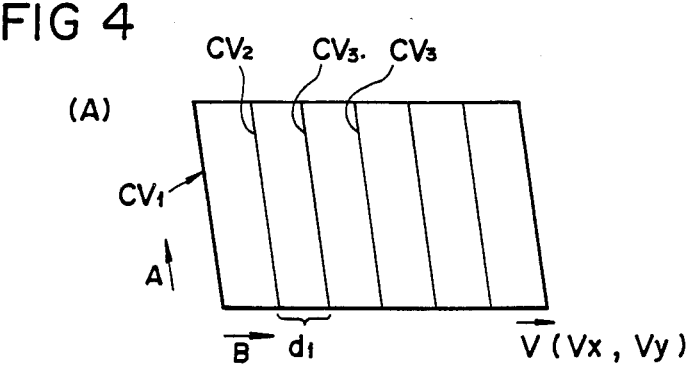
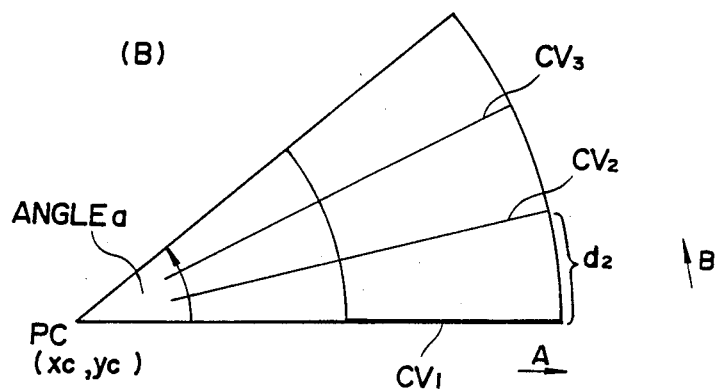
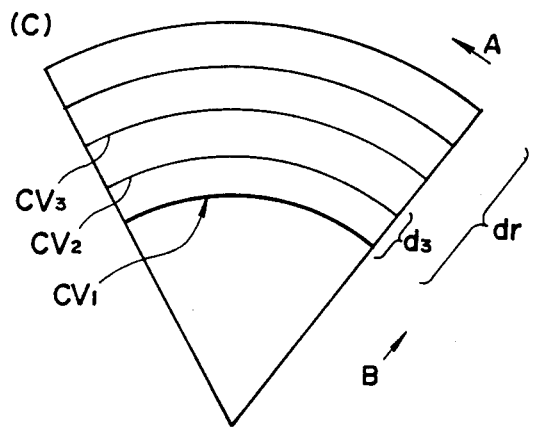

FIG 7
(A)
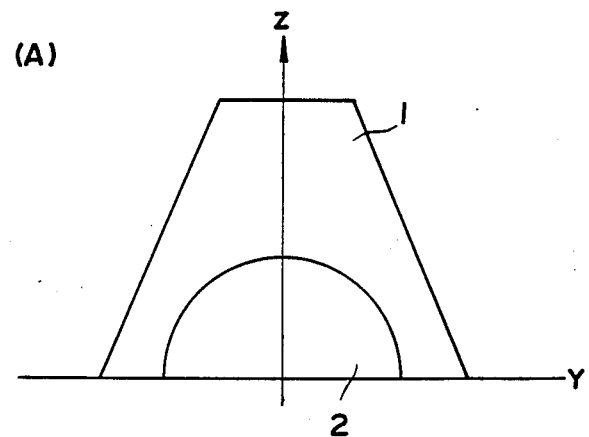
(B)
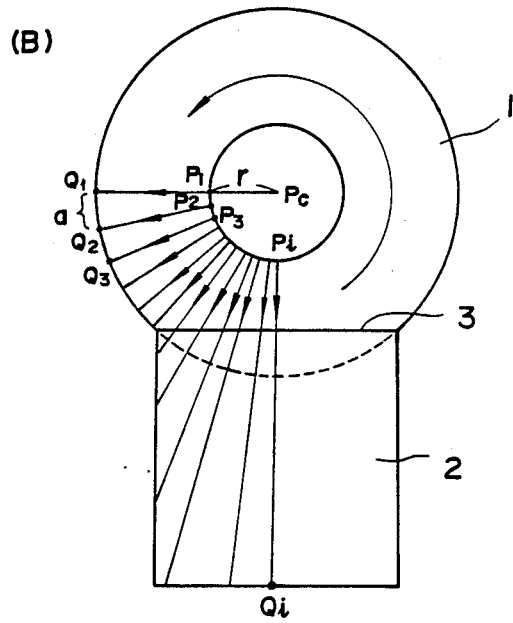

METHOD OF CREATING NC DATA FOR COMPLEX CURVED SURFACES

BACKGROUND OF THE INVENTION

This invention relates to a method of creating NC data for a complex curved surface and, more particularly, to a complex curved surface NC data creation method in which a cutting path pattern is specified for every curved surface constituting a complex curved surface, and cutting is performed by moving a tool along the cutting path conforming to the specified cutting path pattern.

There are cases where it is required to machine a complex curved surface composed of a combination of two or more three-dimensional curved surfaces. FIG. 7 shows a side view (FIG. 7(A)) and a plan view (FIG. 7(B)) of a complex curved surface composed of a combination of two three-dimensional curved surfaces (hereinafter refered to simply as "curved surfaces") 1 and 2. The curved surface 1 has a frusto-conical shape, the curved surface 2 has the shape of a semicircular cylinder. There is also a boundary line 3. To machine this complex curved surface, the conventional practice is to designate one cutting path pattern on the entire complex curved surface, obtain points discretely on the actual cutting path based on the cutting path pattern, create NC data in such a manner that a tool will traverse the points continuously, and machine the complex curved surface on the basis of these NC data.

For instance, in the example of FIG. 7, the cutting path pattern is a group of straight lines which grow incrementally larger every $a^o$ in radial fashion from a center $P_c$ (FIG. 7(B)). Each straight line is a line segment from a point $P_i (i=1, 2, \ldots)$ of radius r to a cutting boundary point $Q_i$. The NC ddata for machining this complex curved surface are generated as follows:

NC data for an approach to a point P1;
NC data for cutting from point $P_1$ to a point $Q_1$;
NC data for a pick-feed to a point $P_2$;
NC data for cutting from point $P_2$ to a point $Q_2$;
NC data for a pick-feed to a point $P_3$;
..................
NC data for cutting from point $P_i$ to point $Q_i$;
..................

When NC data are thus created upon designating only one cutting path pattern for the complex curved surface and the complex curved surface is machined in accordance with the NC data created, an unnatural striped pattern is produced on the surface of the generated complex curved surface and the curved surface cannot be finished off attractively. It should be noted that if the stripes formed on the curved surface 2 are all parallel in the direction of the cylinder or all parallel in the circumferential direction, the surface will be finished off attractively. However, this will not be the case because only one cutting pattern (a radial pattern in the example of FIG. 7) is designated, and as a result, the surface will not exhibit an attractive finish.

SUMMARY OF THE INVENTION

Accordingly, an object of the invention is to provide a complex curved surface NC data creation method for moving a tool along a cutting path pattern which conforms to the shape of each curved surface constituting a complex curved surface, whereby the machined surface can be finished off attractively.

The present invention relates to a method of creating NC data for a complex curved surface comprising a combination of at least two three-dimensional curved surfaces. The NC data creation method includes inputting data specifying each of the curved surfaces and data for specifying a cutting path pattern for each curved surface, obtaining points discretely from a cutting starting point of one curved surface to a boundary point with another of the curved surfaces along a cutting path pattern set on the one curved surface, obtaining points discretely on the other of the curved surfaces along a cutting path pattern specified with respect to the other of the curved surfaces, thereafter performing a pick-feed and obtaining points discretely along the cutting path pattern on each of the curved surfaces in similar fashion, and creating NC data for generating a complex curved surface by successively traversing each of the points.

BRIEF DESCRIPTION OF THE DRAWINGS

FIGS. 1(A) and 1(B) are a side view and a plan view, respectively, of a complex curved surface, for describing the general features of the present invention;

FIGS. 4(A), 4(B) and 4(C) are diagrams for describing cutting path patterns;

FIGS. 7(A) and 7(B) are a side view and a plan view, respectively, of a complex curved surface for describing a conventional method.

DESCRIPTION OF THE PREFERRED EMBODIMENT

Figure 2:
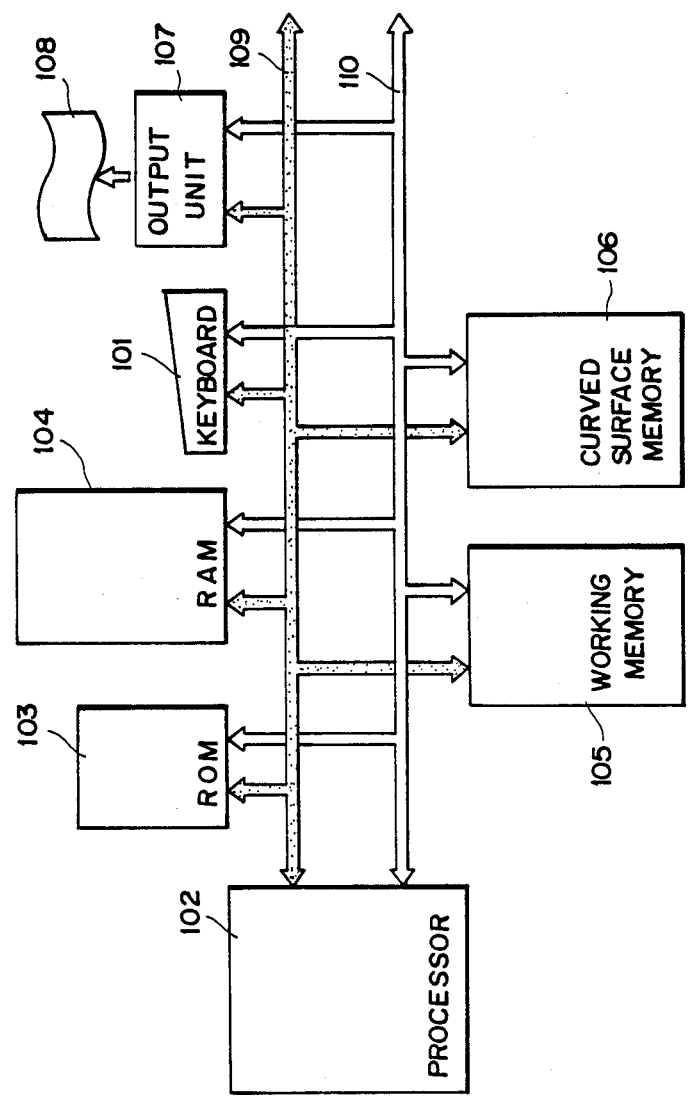
FIG. 2 is a block diagram of an apparatus for practicing the present invention.

FIG. 2 is a block diagram of an automatic programming apparatus for practicing the method of the present invention. In the FIG., numeral 101 denotes a keyboard for data input, 102 a processor, 103 a ROM storing a control program, 104 a RAM, 105 a working memory, 106 a curved surface memory for storing curved surface data of a generated complex curved surface and NC program data for curved surface machining, 107 an output unit for outputting the curved surface data of the generated complex curved surface or the NC program data for curved surface machining to an external storage medium 108 such as a paper tape or magnetic tape, 109 an address bus, and 110 a data bus.

Figure 3:
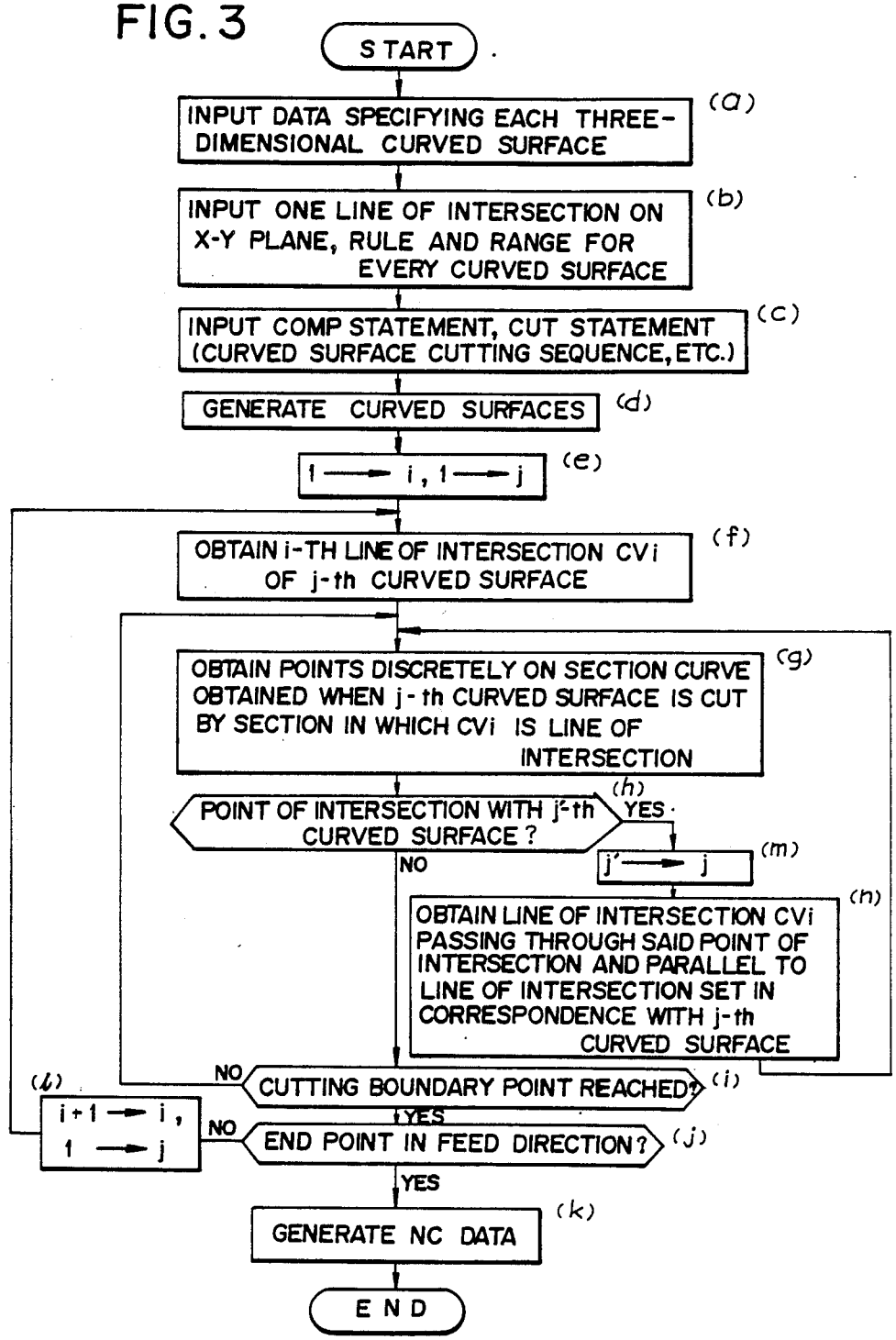
FIG. 3 is a flowchart of processing in accordance with the present invention.

A method of creating NC data for a complex curved surface in accordance with the present invention will now be described in accordance with the flowchart of FIG. 3. It will be assumed that NC data for machining the complex curved surface shown in FIG. 1 will be created.

(a) First, data specifying a first curved surface 11 and a second curved surface 12 which constitute a complex curved surface 10 (see FIG. 1) are inputted from the keyboard 101. It should be noted that the data specifying these curved surfaces are indicative of drive curves, basic curves and the like and are well-known, by reason of which a detailed explanation is omitted (see U.S. Pat. No. 4,491,906). The curved surface 11 is defined under the name SS2, and the curved surface 12 is defined under the same SS1.

(b) Next, for every curved surface 11, 12 constituting the complex curved surface 10, data for specifying a number of sections perpendicular to the X-Y plane cutting these curved surfaces are inputted from the keyboard 101 and stored in the RAM 104.

More specifically, for every curved surface, there are inputted one line of intersection on the X-Y plane, a rule for specifying a number of lines of intersection on the X-Y plane based on the one line of intersection, and a cutting range.

By way of example, if each of the sections are parallel to one another and perpendicular to the X-Y plane and, moreover, the spacing between mutually adjacent sections is fixed, then the line of intersection $CV_i (i=1, 2, 3, \ldots)$ between each section and the X-Y plane will be as shown in FIG. 4(A). In such case, therefore, data specifying a first line of intersection $CV_1$, components $(V_x, V_y)$ of a vector $\vec{V}$ along each axis, and a distance $d_1$ between two mutually adjacent lines of intersection are inputted.

It should be noted that a cutting path pattern is specified by the line-of-intersection data and the distance $d_1$, and that cutting range is specified by the length of the line of intersection $CV_1$ and the vector $\vec{V}$. In FIG. 4, the direction indicated by arrow A is referred to as the cutting direction, and the direction indicated by arrow B is referred to as the feed direction.

In actuality, the following command is inputted to specify the cutting path pattern and cutting range:

$CV_1 = \ldots$ ;

GROUP, 1, $V_x$, $V_y$, $d_1$, i; where GROUP, 1 indicates that the cutting path pattern is of the type shown in FIG. 4(A), and the numerical value i indicates that this is the i-th curved surface $SS_i$.

If each section is perpendicular to the X-Y plane and the angle between mutually adjacent sections is fixed, then lines of intersection $CV_i (i=1, 2, 3, \ldots)$ between respective sections and the X-Y plane will intersect successively at equal angles $d_2$ at a single point $P_c$, as shown in FIG. 4(B). In such case, therefore, data specifying the first line of intersection $CV_1$ and the point Pc $(x_c, y_c)$, the angle $d_2$ defined by two mutually adjacent lines of intersection, and an angle a indicating the cutting range are inputted. In actuality, the following command is inputted:

$CV_1 = \ldots$ ;

GROUP, 2, $x_c$, $y_c$, $d_2$, a, i; where GROUP, 2 indicates that the cutting path pattern is of the type shown in FIG. 4(B).

If each section is perpendicular to the X-Y plane, the sections have the shape of concentric circular cylinders and the spacing between mutually adjacent sections is fixed, then lines of intersection $CV_i (i=1, 2, 3, \ldots)$ between the respective sections and the X-Y plane will be concentric circular arcs, as shown in FIG. 4(C). In such case, therefore, data specifying the first line of intersection $CV_1$, a distance $d_3$ between two mutually adjacent lines of intersection, and the maximum circular arc radius dr, which is the cutting range, are inputted. In actuality, the following command is inputted:

$CV_1 = \ldots$ ;

GROUP, 3, dr, $d_3$, i;

where GROUP, 3 indicates that the cutting path pattern is of the type shown in FIG. 4(C). In the example of FIG. 1, the cutting path pattern shown in FIG. 4(B) is specified for the curved surface 11, and the cutting path pattern shown in FIG. 4(A) is specified for the curved surface 12.

(c) When the cutting path patterns are finished being specified, a curved surface cutting sequence is then inputted in the form of a COMP statement and CUT statement.

In the example of FIG. 1, the cutting sequence is inputted by

COMP, $SS_2$;
CUT, $SS_1$;

It should be noted tha the curved surface specified by the CUT statement is a main curved surface ($SS_1$), and the curved surface specified by the COMP statement is a subordinate curved surface ($SS_2$). The cutting path pattern for a main curved surface takes precedence over those for subordinate curved surfaces at the portions where these curved surfaces overlap. Among the subordinate curved surfaces, the one earliest in the cutting sequence takes precedence. In FIG. 1, the case illustrated is one in which the complex curved surface is constituted by the two curved surfaces 11, 12. In general, however, a complex curved surface is composed of (n+1) curved surfaces, in which case n COMP statements and one CUT statement would be commanded and the cutting sequence would be the order in which the commands are given.

(d) When the necessary data have been inputted, the processor generates each of the curved surfaces 11, 12 through a well-known method.

Figure 5:
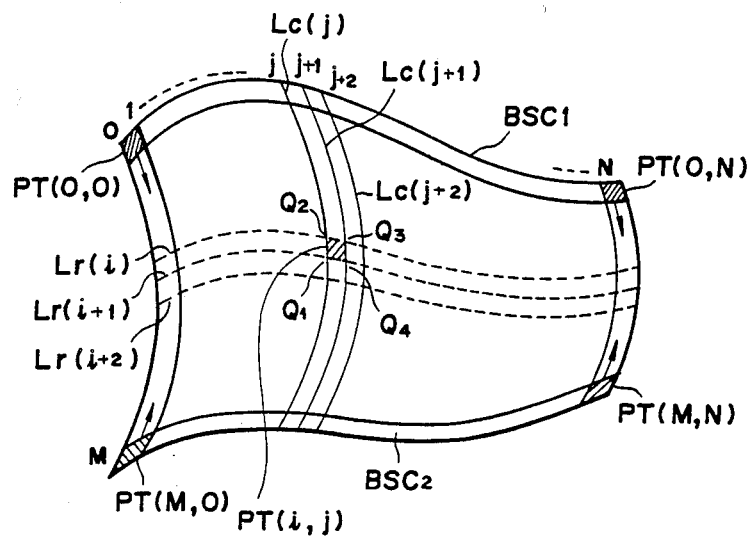
FIGS. 5 and 6 are diagrams for describing the computations of points on a curved surface.

As shown in FIG. 5, let $L_c(j)$ express an intermediate section curve containing a j-th dividing point on a basic curve BSCl of a curved surface, and let $L_r(i)$ express a curve obtained by connecting an i-th dividing point on each of intermediate section curves $L_c(j)$ (j=1, 2, 3, ... n). A quadrilateral bounded by curves $L_c(j)$, $L_c(j+1)$, $L_r(i)$ and $L_r(i+1)$ shall be referred to as a "patch" PT (i,j). The four vertices $Q_1$, $Q_2$, $Q_3$, $Q_4$ of the patch PT (i,j) are generated by curved surface creation processing and are stored in the curve surface memory 106.

When the processing for generating each of the curved surfaces in accordance with step (d) is completed, processing for creating NC data begins, as follows:

(e) First, the operations 1→i, 1→j are performed.

(f) The processor 102 then obtains a line of intersection $CV_i$ of the j-th curved surface $SS_j$, which is given in step (b), on the i-th X-Y plane.

(g) When the i-th line of intersection $CV_i$ has been found, the processor 102 obtains points discretely on a section curve obtained when the j-th curved surface is cut by a section perpendicular to the X-Y plane on which the line of intersection lies.

More specifically, the processor finds the coordinates of points of intersection $P_{1i}$, $P_{2i}$ (see FIG. 6) between the i-th line of intersection $CV_i$ and the sides of projection patches, which are obtained by projecting each patch (FIG. 5) of the j-th curved surface onto the X-Y plane. Next, the processor calculates the coordinates of points on the j-th curved surface that correspond to these points of intersection. That is, the processor obtains the coordinates of points on the j-th curved surface, which are points obtained by projecting the points of intersection $P_{1i}$, $P_{2i}$ onto the X-Y plane.

Figure 6:
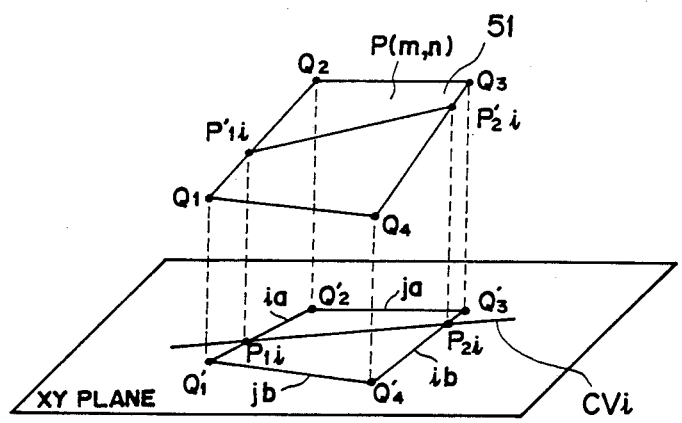

FIG. 6 is a view for describing a method of computing the coordinates of the points on the curved surface. Four sides $i_a$, $i_b$, $j_a$, $j_b$ are obtained by projecting a predetermined patch P (m, n) on a three-dimensional curved surface onto the X-Y plane. Let $P_{1i}$, $P_{2i}$ represent the points of intersection between the i-th line of intersection $CV_i$ and a predetermined two of these four sides, and let $(x_{1i}, y_{1i})$, $(x_{2i}, y_{2i})$ represent the coordinates of these points of intersection. Further, let $Q_1'$, $Q_2'$ denote the end points of the side $i_a$ intersected by the line of intersection $CV_i$, let $Q_3'$, $Q_4'$ denote the end points of the side $i_b$ intersected by the line of intersection $CV_i$, let $Q_i$ ($i=1 \sim 4$) represent the points on the three-dimensional curved surface that correspond to the points $Q_i'$ ($i=1 \sim 4$), and let ($x_i$, $Y_i$, $z_i$) denote the coordinates of each of the points $Q_i$. Then, the z coordinates $z_{1i}$, $z_{2i}$ of the points $P_{1i}'$, $P_{2i}'$ on the curved surface that correspond to the points of intersection $P_{1i}$, $P_{2i}$ are calculated in accordance with the following equations:

$z_{1i} = 1 + (Z_2 - z_1)(x_{1i} - x_1)/(x_2 - x_1)$ $z_{2i} = z_3 + (z_4 - z_3)(x_{2i} - 3)/(x_4 - x_3)$ The coordinates of the points on the curved surface will be ($x_{1i}$, $y_{1i}$, $z_{1i}$), $x_{2i}$, $y_{2i}$, $z_{2i}$).

(h) Whenever a point on the j-th curved surface is obtained, the processor checks whether the point forms a point of intersection (a boundary point) with another curved surface (let this surface be a j'th curved surface). It should be noted that an initial point under the j'th curved surface is taken as a point of intesection (a boundary point). Accordingly, the processor obtains points on each curved surface that correspond to the projection points in step (g) and, on the basis of the magnitude of the Z values thereof, checks whether a point of intersection has been reached.

(i) If a point of intersection has not been been reached, the processor checks whether a boundary point in the cutting direction (see the direction indicated by arrow A in FIG. 4) has been reached.

If the boundary point in the cutting direction has not been reached, processing from step (g) onward is repeated.

(j) If a boundary point in the cutting direction (see the direction indicated by arrow B in FIG. 4) is reached, however, the processor checks whether a boundary point in the feed direction has been reached.

(k) If a boundary point in the feed direction has been reached, curved surface generation processing ends, after which the processor creates NC data in such a manner that a tool will successively traverse the points that have been obtained. This completes NC data creation processing.

(l) If a boundary point in the feed direction is not reached at step (j), however, the operations $i+1 \rightarrow i$, $1 \rightarrow j$ are performed and processing from step (f) onward is repeated with regard to the next line of intersection obtained by a pick-feed of a predetermined amount in the feed direction.

(m) If it is judged in step (h) that a point obtained in step (g) forms a point of intersection (a boundary point) with a j' curved surface, the processor performs the operation $j' \rightarrow j$.

(n) Next, the processor obtains a line of intersection $CV_i$ passing through the abovementioned point of intersection and parallel to the line of intersection $CV_1$ set in correspondence with the j-th curved surface, and then repeats processing from step (g) onward.

In accordance with the present invention as described above, a tool can be moved along a cutting path pattern conforming to the shape of each curved surface constituting a complex curved surface, thus enabling the machined surface to be finished off attractively.

What is claimed is:

1. A method of creating NC data for a complex curved surface including a combination of at least two three-dimensional curved surfaces, comprising the steps of:
    (a) inputting data specifying each of the at least two three-dimensional curved surfaces and data for specifying a cutting path pattern for each of the at least two three-dimensional curved surfaces, said inputting step comprising inputting a cutting path pattern which is one of a pattern of equidistantly spaced parallel straight lines, a pattern of equiangularly spaced radiating straight lines, and a pattern of equidistantly spaced concentric circular arcs;
    (b) obtaining points discretely from a cutting starting point of a first of the at least two three-dimensional curved surfaces to a boundary point with a second of the at least two three-dimensional curved surfaces along the cutting path pattern set for the first curved surface;
    (c) obtaining points discretely on the second curved surface along the cutting path pattern specified with respect to the second curved surface;
    (d) thereafter performing a pick-feed and obtaining points discretely along the cutting path patterns on each of the first and second curved surfaces by repeating said steps (b) and (c); and
    (e) creating NC data for generating a complex curved surface by successively traversing each of the points obtained in said steps (b), (c) and (d).

2. A method of creating NC data for a complex curved surface according to claim 1, wherein said step (a) further comprises inputting as the data for specifying the cutting path pattern (i) data indicative of the one of the pattern of parallel straight lines, the pattern of radiating straight lines and the pattern of concentric circular arcs, (ii) data indicative of one line of intersection with a predetermined plane, and (iii) a rule specifying a number of lines of intersection on a predetermined plane on the basis of the line of intersection.

3. A method of creating NC data for a complex curved surface according to claim 2, wherein discrete points on a section curve obtained when a predetermined curved surface is cut by a section in which an i-th line of intersection from among said number of lines of intersection is a line of intersection in said predetermined plane are taken as said points.

4. A method of creating NC data for a complex curved surface according to claim 3, wherein:
    said step (a) comprises specifying a cutting range along with the data for specifying the cutting path pattern for each of the at least two three-dimensional cutting surfaces;
    said steps (b) and (c) each comprise obtaining points discretely up to a boundary of the cutting range along a first direction; and
    said step (d) comprises thereafter obtaining points discretely in a similar manner upon performing a pick-feed of a predetermined amount in a second direction different from said the first direction, and subsequently obtaining points in a similar manner until a boundary in the second direction is reached.

* * * * *

UNITED STATES PATENT AND TRADEMARK OFFICE
CERTIFICATE OF CORRECTION

PATENT NO. : 4,851,986
DATED : JULY 25, 1989
INVENTOR(S) : MASAKI SEKI ET AL.

It is certified that error appears in the above-identified patent and that said Letters Patent is hereby corrected as shown below:

FRONT PAGE [57] ABSTRACT, line 16, "performed points" should be --performed and points--.

Col. 1, line 37, "ddata" should be --data--.

Col. 4, line 7, "tha" should be --that--.

Col. 5, line 7, "z coordinates" should be --Z coordinates--;

line 11, "$z_{1i}=_1 + (Z_2$" should be --$z_{1i}=z_1+(z_2$--;

line 12, "$(x_{2i}-_3)/$" should be --$(x_{2i}-x_3)/$--;

line 12, delete "The coordinates of";

line 13, before "the points" insert --The coordinates of--;

line 13, "$x_{2i}$" should be --$(x_{2i},$--;

line 20, "intesection" should be --intersection--.

Signed and Sealed this

Eighth Day of May, 1990

Attest:

HARRY F. MANBECK, JR.

*Attesting Officer*      *Commissioner of Patents and Trademarks*